INVENTOR
Angelo Comunnetti

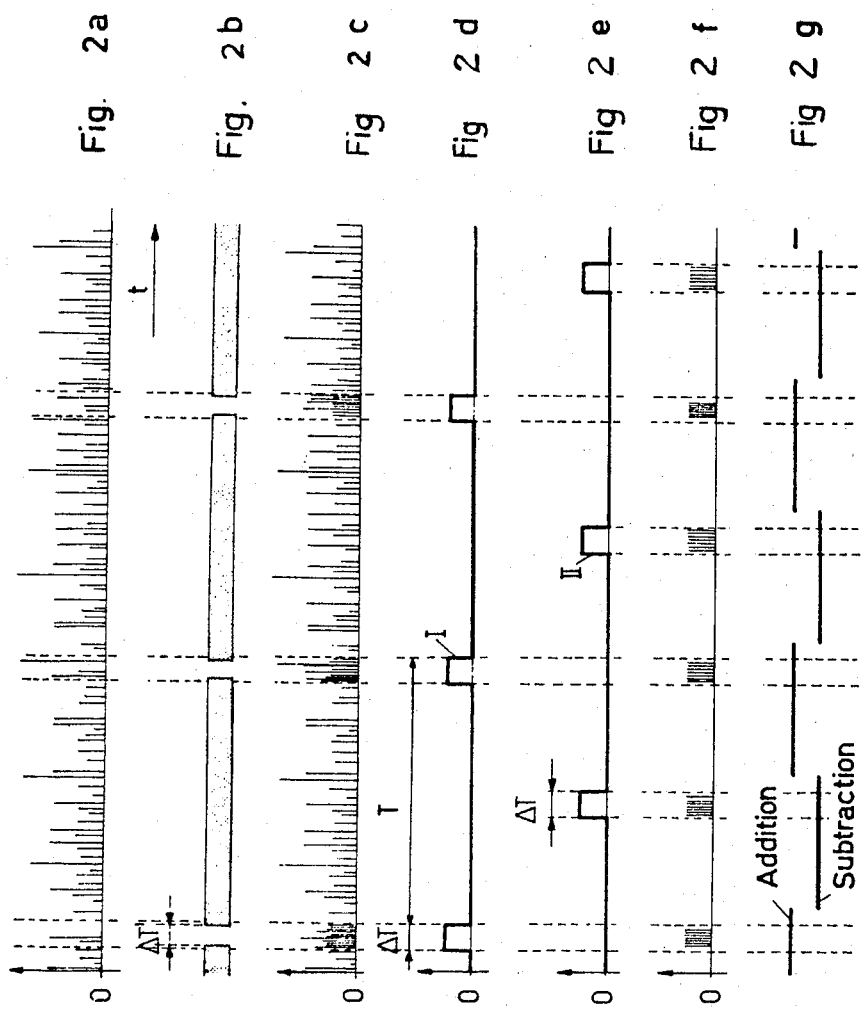

United States Patent Office

3,428,804
Patented Feb. 18, 1969

3,428,804
METHOD OF AND APPARATUS FOR STABILIZING THE GAIN OF NUCLEAR PULSE SPECTROMETERS
Angelo Comunnetti, Binningen, Basel, Switzerland, assignor to Gesellschaft zur Forderung der Forschung an der Eidgenossischen Technischen Hochschule, Zurich, Switzerland
Filed June 1, 1965, Ser. No. 460,273
Claims priority, application Switzerland, June 4, 1964, 7,402/64
U.S. Cl. 250—71.5        11 Claims
Int. Cl. G01t 1/20

ABSTRACT OF THE DISCLOSURE

A method of stabilizing the overall gain of nuclear spectrometers and particularly those of the scintillation type wherein a mechanically chopped reference source is used to control the system gain by pulse-difference feedback in such manner that complete separation of the reference spectrum from the spectrum to be analyzed is obtained.

---

The present invention relates to methods of stabilizing the gain of nuclear pulse spectrometers, and more particularly to stabilizing the gain of scintillation spectrometers.

Certain methods of accomplishing this are already widely known; these known methods can be divided into two main groups, namely:

(a) By the nature of reference;
(b) By the point where a correction signal is obtained for stabilization.

It is clear that for the stabilization of the whole apparatus network of a scintillation spectrometer including a scintillator, only a reference source can be used whose radiation is of the same kind as that to be investigated. Furthermore, the point at which the correction signal should be obtained is the output from the pulse analyzer. Several known methods fulfill these requirements to a certain degree, only.

All methods which use analogue circuits, i.e. apparatus which carries out a conversion of one type of signal to another, e.g. a pulse rate into a voltage, and which compare the signal obtained with standard signal, suffer from the disadvantage that all conversion methods are dependent on surrounding conditions. The only suitable methods consist in comparing similar quantities with one another, i.e. a pulse rate with another pulse rate, voltages with voltages, etc.

The method according to the present invention is concerned with the stabilization of pulse spectrometers, especially for use in $\gamma$ spectroscopy.

As in already known methods, two pulse rates are compared with one another. This results in a null comparison so that the accuracy is given essentially by each of the comparison normals and the sensitivity by the gain of the comparison system. The present invention is directed to a novel method of stabilizing the gain of a pulse spectrometer in which periodically reference source radiation is superimposed for small time intervals on radiation from a source to be measured by means of a chopper device and pulses emitted consequent to the two radiations are analyzed and recorded in order to obtain a first set of information, the same procedure is periodically repeated with a phase displacement during the same or most similar length time intervals and with the reference source radiation gated out to obtain a second set of information; and the second set of information is then subtracted from the first set of information to provide pulse numbers whose mean value is not influenced by the radiation from the source being measured and whose time-wise mean value is a measure of the variation in gain and is used to compensate said variation in gain.

The two series of pulse numbers to be subtracted from one another can be obtained for example as follows:

(a) The first series of pulse numbers is obtained from the electrical output pulses of a photo-multiplier-scintillation system whose scintillator (NaI) is permanently exposed to the radiation from the source X under examination and during the first-named time intervals is irradiated additionally by a reference source (for example $Cs^{137}$). The number of pulses which exceed a voltage threshold $U_o$ form the first series of pulse numbers which is dependent on the gain $\mu$. Preferably, the voltage threshold $U_o$ is chosen to be equal to the pulse height $E_p$, at which, in pulse spectra of the unstabilized system, the photo-peak of the reference source radiation lies.

(b) The second series of pulse numbers is obtained by adding the number of pulses provided in the same manner solely by the radiation from the source being examined and the number of gain-independent standard pulses which are supplied from a crystal-stabilized oscillator during the second-named time intervals.

The reference pulse source is, for example, a $\gamma$ source which is periodically blocked by means of a mechanical chopper having a rotary shutter. The shutter is open for a proportion of time represented by $\Delta T'/T$. Synchronized therewith, i.e. in fixed phase relation to the chopper, is an optical system which is controlled by the rotor shaft of the chopper and which provides electrical control signals. A group of standard pulses is provided during the time intervals $\Delta T$ with period $T$ and a group of reference pulses during the time intervals $\Delta T'$, these latter time intervals, however, being displaced in time relative to the first-named intervals by $T/2$. X-pulses provided by the source being examined are analyzed and counted together with either the standard pulses or the reference source pulses during equal length time intervals $\Delta T$.

All the pulses are stored in a memory device whereby the pulses in successive time intervals are counted alternately positive and negative. Thus, during a period $\Delta T$ the reference source pulses together wtih the X-pulses exceeding the voltage threshold $U_o$ are registered in the store on the one hand, and the standard pulses together with the X-pulses exceeding the voltage threshold $U_o$, but displaced by $T/2$ and with reversed sign, are registered in the store on the other hand. So long as the intensity of the X-source does not vary appreciably during the period $T/2$, the effect of the intensity of the source is eliminated by this subtraction method. The time-wise mean value of the store content is therefore a measure of any drift in gain.

If one and the same apparatus network produces both the reference source pulses and also the standard pulses there is no necessity for high accuracy requirements as regards constancy of gain at any part of the network.

In order to block the reference source spectrum from the spectrum of the X-source, counting is suppressed by a "NOT" gate during the time intervals $\Delta T$.

In order that the invention may be more readily understood reference is now made to the following description of certain methods according to the invention and to the accompanying drawings, in which:

FIGS. 2a to 2g are graphical representations of different functions such as control signals, pulses to be measured, and reference source pulses with respect to time;

Figure 4:
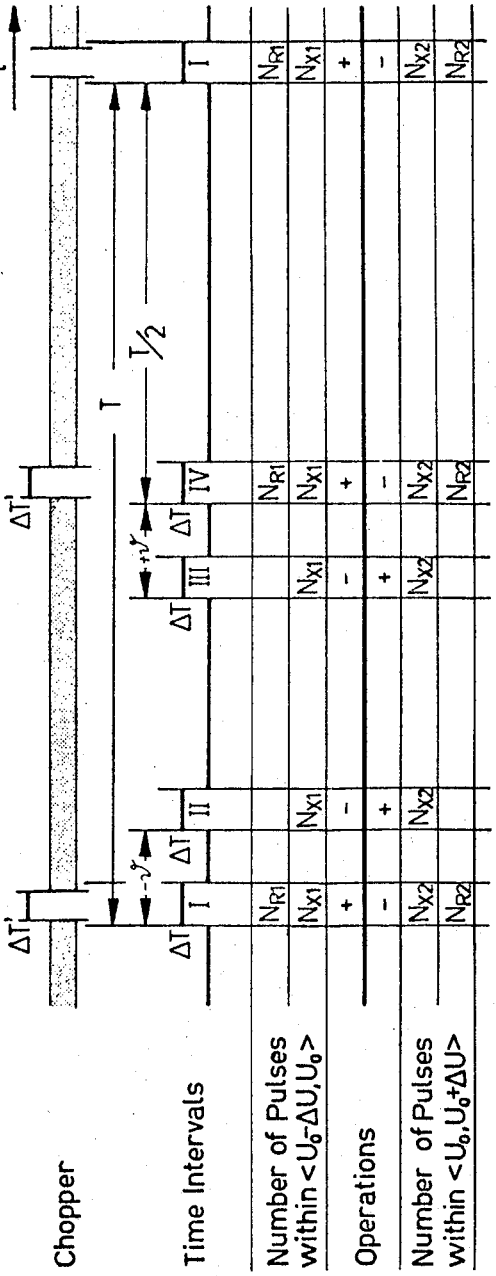
Figure 5:
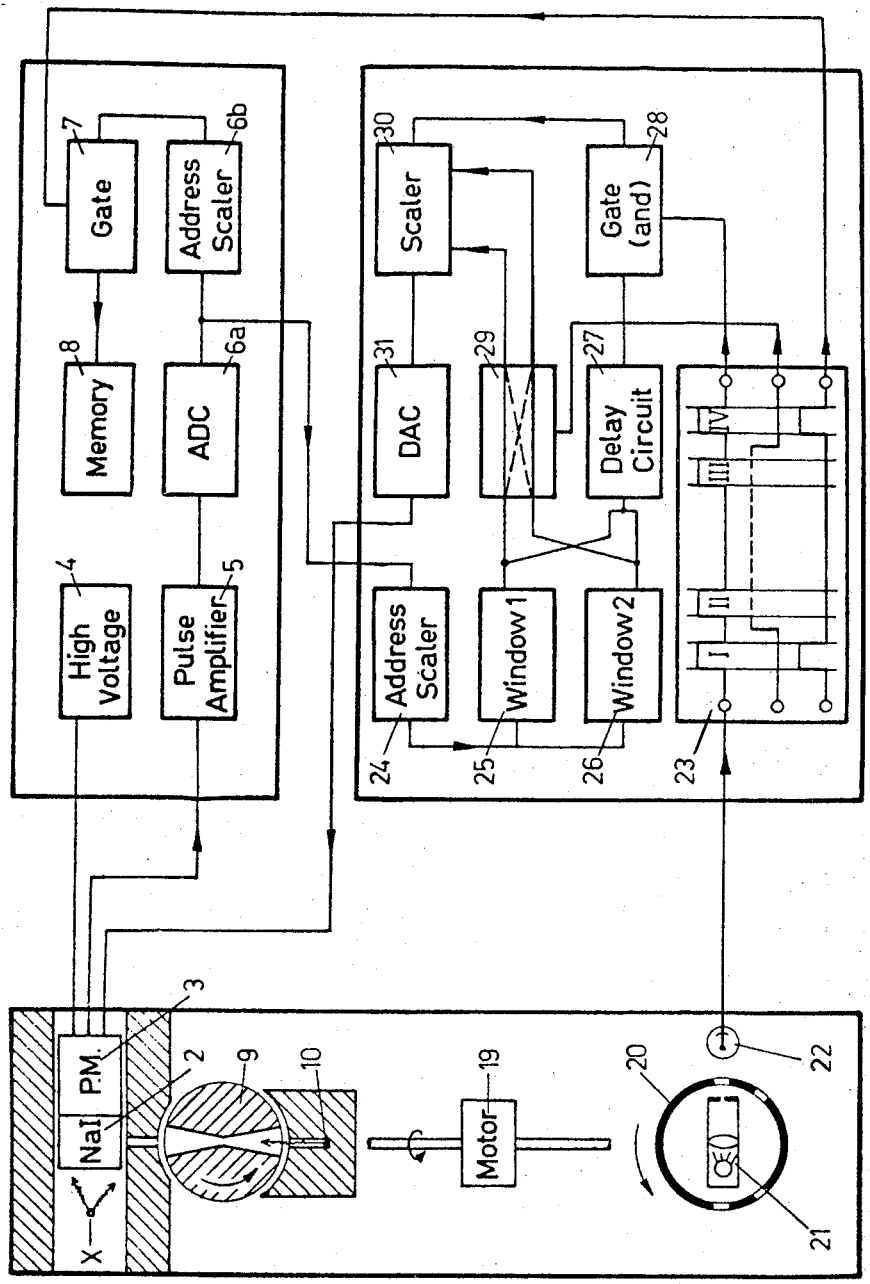

FIG. 4 indicates the time-wise sequence of method steps of one embodiment of the method according to the invention as applied to a multi-channel analyser; and, FIG. 5 is a block schematic diagram of a multi-channel spectrometer which is gain-stabilized according to the method of the present invention.

Figure 1:
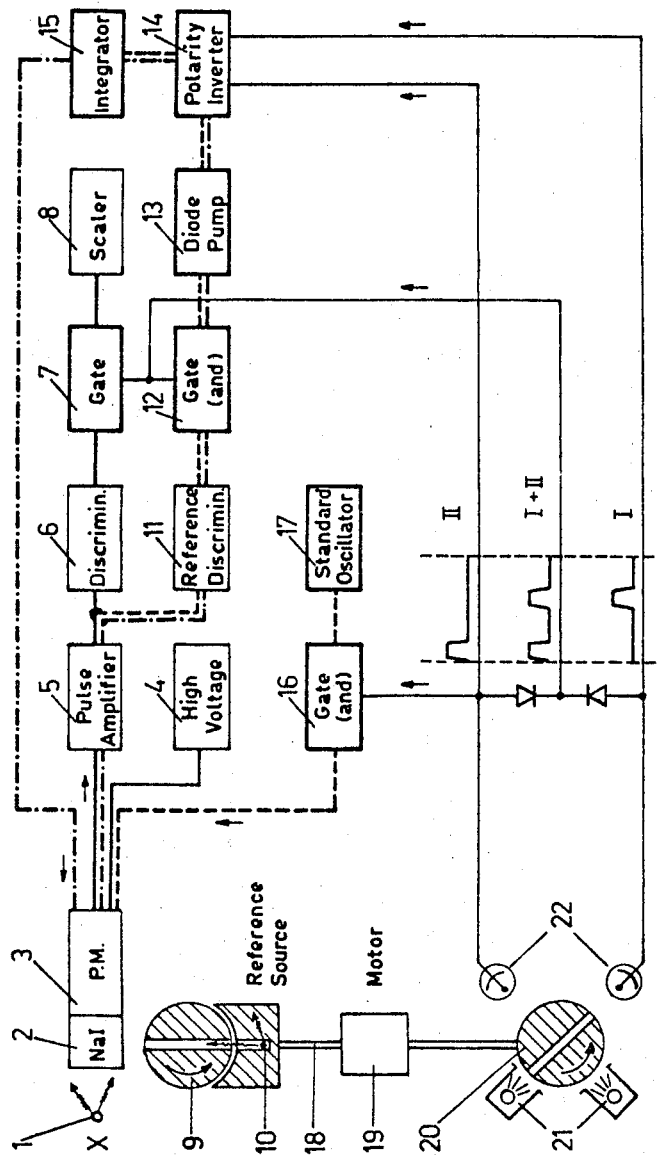
FIG. 1 is a schematic overall view of one complete apparatus lay-out of a single channel $\gamma$-spectrometer.

A well-known single-channel spectrometer arrangement used to analyse the radiation from a source X comprises, in a similar manner to part of the arrangement as shown in FIG. 1, a scintillator crystal 2, for example of sodium iodide, and a photo-multiplier 3 which is energized from an H.T. source 4. The pulses emitted by the photo-multiplier 3 are first amplified in a pulse amplifier 5 connected thereto, after which they are shaped and are discriminated according to size in a discriminator 6. The discriminated pulses are then rendered into a uniform size by the same apparatus and are recorded by a pulse counter 8.

In the gain-stabilized spectrometer according to the invention this basic arrangement is retained with the exception that a "NOT" gate 7 is connected between the discriminator 6 and the pulse counter or scaler 8.

Further essential additions in the arrangement according to the invention are a chopper having a rotary shutter 9, a reference pulse source 10, an electronic circuit indicated at 11 to 15, an "AND" gate 16 with a standard oscillator 17, a drive motor 19 coupled by a shaft 18 to the chopper shutter 9, and an optical control system 20, 21, 22. The electronic circuit 11 to 15 is connected to the output of the pulse amplifier 5 and comprises a reference discriminator 11, an "AND" gate 12, a diode pump 13, an electro-mechanical polarity inverter 14 controlled by electrical signals and an integrator 15. The optical control system 20, 21, 22 consists of rotary shutter 20 coupled to the shaft 18, two light sources 21, and two photocells 22 each associated with one of the light sources.

All the components 7, 12, 13, 14, 15, 16 and 17 represented by heavier solid lines in FIG. 1 make up the electronic part of the stabilizing instrument and can be located in one apparatus unit, while the other parts represent standard components.

In FIG. 2a the time-wise sequence and magnitude of the electrical pulses at the output of the photo-multiplier 3 are shown, such pulses being produced by the emission of energy resulting from the absorption of the radiation from source X by the scintillator crystal 2.

The rotary chopper shutter 9 which periodically is open for a length of time $\Delta T'$ indicated in FIG. 2b permits the radiation from the reference source 10 to impinge periodically on the scintillator crystal 2 so that the pulses from source X are superimposed on reference source pulses during the intervals $\Delta T'$ that the chopper shutter is open. FIG. 2c shows the resulting superimposed pulse pattern.

The optical control system 20, 21, 22 produces control signals I and II whose pattern with respect to time is indicated in FIGS. 2d and 2e respectively. The control signals occur with the period T during the time intervals $\Delta T$. Control signals II are displaced relative to control signals I by a time equal to $T/2$.

Each control signal I of duration $\Delta T$ within which one group of reference source pulses is emitted causes the operation of:

(a) The "AND" gate 12 to pass to the integrator 15 the reference pulses and X-source pulses which exceed a threshold $U_0$ defined by the reference discriminator 11;

(b) The electro-magnetic polarity inverter 14 to effect addition of the pulses during the next following time interval $\Delta T$, and (c) The "NOT" gate 7 for gating out pulses to the pulse counter 8.

Each control signal II of the same duration $\Delta T$, but displaced by a time period $T/2$, causes the operation of:

(a) The "AND" gates 16 and 12 to pass to the integrator 15 a group of standard pulses and X-source pulses exceeding the threshold $U_0$ of the reference discriminator 11;

(b) The "NOT" gate 7 for gating out pulses to the pulse counter 8; and (c) The electro-magnetic polarity inverter 14 to effect subtraction of the pulses during the next following interval $\Delta T$.

From the output of the discriminator 11 groups of uniform pulses are transmitted through gate 12 to the input to the diode pump 13, as shown in FIG. 2f, which in turn delivers positive or negative charges to the integrator 15 in dependence upon whether the polarity inverter 14 is in its additive or subtractive state (FIG. 2g).

The integrator 15 provides an analogue D.C. signal which is proportional to the time-wise mean value of the arithmetric sum of the charges supplied thereto, i.e. proportional to $N_I - N_{II}$, where $N_I$ is equal to the number of pulses in the time interval I of duration $\Delta T$ and $N_{II}$ is equal to the number of pulses in the subsequent time interval II of the same duration $\Delta T$. The numbers of pulses $N_I$ and $N_{II}$ can be expressed according to the following equations:

$$N_I = \delta(\mu) \cdot \Delta T' + \delta_X \cdot \Delta T \qquad (1)$$

$$N_{II} = (\delta_{ST} + \delta_X) \Delta T \qquad (2)$$

wherein $\delta(\mu)$ is the frequency of the reference source pulses, such frequency being dependent on the gain $\mu$, $\delta_X$ is the frequency of the X-source pulses, dependent likewise on the gain $\mu$, and $\delta_{ST}$ is the frequency of the standard pulses, said latter frequency being independent of the gain. If one subtracts $N_{II}$ from $N_I$ the following equation is obtained:

$$N_I - N_{II} = \delta(\mu) \cdot \Delta T' - \delta_{ST} \cdot \Delta T \qquad (3)$$

It will thus be apparent that as a result from the subtraction the influence of the X-source pulses is eliminated from the obtained pulse member differences provided that the intensity of the X-source and thus the frequency $\delta_X$ does not change noticeably in the time interval between the reference source pulse group and the succeeding standard pulses. The D.C. voltage signal produced by the integrator is a measure of any drift in gain and is used as a compensating feedback signal applied to the cathode of the photo-multiplier 3. The feedback circuit is indicated in FIG. 1 by the dot-dash lines. Thus, any drift in gain within the spectrometer is reduced proportionally to the difference in pulse numbers $$N_I - N_{II} \approx \frac{\Delta T'}{\Delta T} - \delta(\mu) - \delta_{ST}$$

and hence the gain of the spectrometer is stabilized.

The described arrangement uses one diode pump 13 with the subsequent electro-magnetic polarity inverter 14 which supplies the groups of current pulses corresponding to the control signals I and II to the integrator 15 with either positive or negative sign. This circuit permits the reference pulses as well as the standard source pulses to be applied to the integrator 15 via the same apparatus 5, 11, 12, 13, 14, so that any parameter drift of any of the elements is subjected to the action of the reverse-feedback circuit and is thereby compensated.

As a modification providing a second embodiment, the standard frequency can itself be obtained from the reference source 10. The maximum gain sensitivity of the reference pulse frequency $\delta(\mu)$ is found to be when the threshold voltage $U_0$ of the reference discriminator 11 is chosen equal to $E_P$, i.e. the value of the photo-peak which is produced by the photo-electric effect in the crystal. Use has already been made of this fact in the first embodiment. The minimum gain sensitivity of the reference pulse frequency $\delta(\mu)$ is found to be when $U_0 = E_V$, i.e. the value of the pulse amplitude of the troughs is arranged to lie between the photo-peak and the Compton peak in FIGS. 3a and 3b the photo-peak is the sharp right-hand peak and the Compton peak is the wider left-hand peak. This latter fact, which is not made use of in the first embodiment, permits the reference source 10 to be used also as the standard pulse source when the discriminator voltage threshold $U_o$ is equal to $E_V$. Periodic switching of the discriminator voltage threshold $U_o$ from $E_P$ to $E_V$ and vice versa permits the reference pulse frequency $\delta(\mu)$ to be obtained when $U_o=E_P$ and the standard pulse frequency $\delta_{ST}$ to be obtained when $U_o=E_V$.

While in the first embodiment which uses a standard oscillator a comparison cycle covers two time intervals $\Delta T$, whereby during $\Delta T'$ within the first interval $\Delta T$ the reference spectrum is added to the spectrum to be measured, and during the second interval $\Delta T$ the standard pulse spectrum is superimposed on the spectrum to be measured, in this second embodiment one comparison cycle covers four time intervals $\Delta T$ in which the four following pulse numbers are registered;

$$N_I = \delta(\mu)\Delta T' + \delta_{XP} \cdot \Delta T$$
$$N_{II} = \delta_{XP} \cdot \Delta T$$
$$N_{III} = \delta_V T' + \delta_{XV} \cdot \Delta T$$
$$N_{IV} = \delta_{XV} \cdot \Delta T$$

wherein the index P is used to indicate discrimination at the photo-peak ($U_o=E_P$) and the index V is used to indicate discrimination in the valley ($U_o=E_V$).

The pulse frequency $\delta_V$ is now used as a practically gain-independent standard pulse frequency.

With a fairly good resolving power for the scintillator crystal $\delta_V$ is approximately equal to $2\delta(\mu_o)$, where $\mu_o$ is the gain valve at which the discrimination threshold $U_o$ that halves the photo-peak.

By performing the operation $2(N_I-N_{II})-(N_{III}-N_{IV})$ in each cycle numbers are obtained whose mean value with respect to time represents a measure of the variation in gain.

The described first and second embodiments are particularly suitable for use with spectrometers with single-channel analysers. With reference to the first embodiment it is to be noted that it can also be used with pulse spectra which have no photo-peak. The second embodiment however makes full use of the existence of a photo-peak.

If a spectrometer is provided with a multi-channel analyser and the radiation detector replies with at least partly uniform signal amplitude for mono-energetic radiation (photo-peak), then the method of stabilization is preferably altered in the manner disclosed in the following description of a third embodiment according to the invention with reference to FIGS. 3a, 3b, 4 and 5.

Figure 3A:
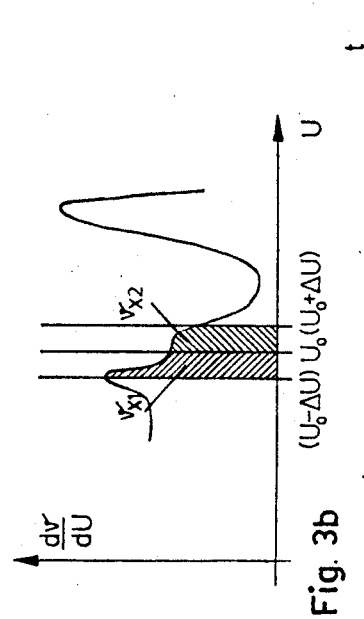
FIG. 3a shows the pulse spectrum of the reference source.
Figure 3B:
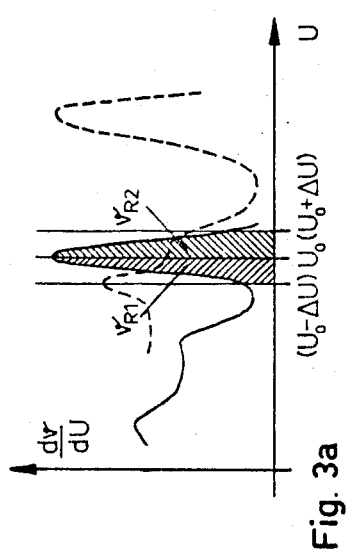
FIG. 3b shows the pulse spectrum of the source X which is under examination.

While in both the first and second embodiments certain stress was laid upon the fact that the gain-dependent reference pulse frequency $\delta(\mu)$ was compared with a pulse frequency $\delta_{ST}$ or $\delta_V$, which is completely or substantially completely independent of gain the existence of a photo-peak is used in the third embodiment in a way similar to that used in various commercial spectrum stabilizers. This method, known under the name of De Waard, is indicated in FIG. 3a with reference to the pulse spectrum of the reference source. The photo-peak is halved into two spectral regions by two windows 1 and 2, namely from $U_o-\Delta U$ up to $U_o$ and from $U_o$ up to $U_o+\Delta U$. The two pulse frequencies from these regions are referred to as $\delta_{R1}$ and $\delta_{R2}$. They are gain-dependent in opposite directions. The problem with regard to stabilization is to maintain the pulse frequency difference $\delta_{R3}-\delta_{R2}$ zero on average. An instrument working in this manner effects stabilization in a trouble-free manner; difficulties arise, however, as soon as this so-called spectrum stabilizer is used for measuring unknown spectra from the source X under examination, one such unknown spectrum being shown in FIG. 3b. Only if the spectrum to be measured extends horizontally in the spectral region of stabilization between $U_o-\Delta U$ and $U_o+\Delta U$ does the gain value remain independent of intensity variations of the measurement source X. This requirement is, however, hardly ever obtained, as for example in activation analysis. According to FIG. 3b the same source X contributes different pulse frequencies to the windows 1 and 2.

The characteristic of the third embodiment lies in the manner in which the influence of the source under examination on the stabilization is cut out i.e. the manner in which a gain stabilizer is produced by modification of the known spectrum stabilizer.

In the third embodiment, in an analogous manner to that used in the first two embodiments, the interference between the spectrum to be measured and the reference spectrum is eliminated by pulse number subtraction, with the difference, however, that the two spectral regions $U_o-\Delta U$ up to $U_o$ and from $U_o$ up to $U_o+\Delta U$ are taken into account simultaneously by the windows 1 and 2.

Principally, during a first time interval of duration $\Delta T$ the difference of the numbers of pulses from the windows 1 and 2 originating from the reference source and the X-source is recorded, i.e., $+(N_{R1}+N_{X1})-(N_{R2}+N_{X2})$ and, later, with the reference source blocked, during a second time interval of the same duration $\Delta T$, the difference of the numbers of pulses from the windows 1 and 2 originating from the X-source alone is recorded with inverted polarity i.e. $-N_{X1}+N_{X2}$. The index R refers to the reference source, the index X to the source to be measured, the reference 1 to window 1 and the reference 2 to window 2. The second mentioned recording with inverted polarity results in a subtraction of the second pulse number difference from the first one. The result is a pulse number $N_{R1}-N_{R2}$, if the intensity of the source X is constant, and can be used to provide an analogue feedback signal to compensate for any drift in gain.

Since, however, the intensity of the source X to be measured may vary with time it is preferable not to use the method just described but rather to use that represented in FIG. 4. A comparison cycle in this arrangement covers four time intervals I, II, III and IV, which are repeated with a period T. The time intervals I and IV which are of duration $\Delta T$ include the interval $\Delta T'$ during which the radiation from the reference source is superimposed on the radiation from the source X. The time intervals I and IV are displaced from one another by T/2. The time intervals II and III are of the same duration $\Delta T$, and during these time intervals only the radiation from source X is recorded. The time intervals II and III are displaced in phase relative to the intervals I and IV, with the intervals II displaced negatively relative to the intervals I and with the intervals III displaced positively relative to the intervals IV. The pulse numbers recorded in the time intervals I to IV are thus:

| Interval | Window 1 | Window 2 |
|---|---|---|
| I | $N_{R1}+N_{X1}$ | $N_{R2}+N_{X2}$ |
| II | $N_{X1}$ | $N_{X2}$ |
| III | $N_{X1}$ | $N_{X2}$ |
| IV | $N_{R1}+N_{X1}$ | $N_{R2}+N_{X2}$ |

The pulses from the window 1 are recorded corresponding to the sequence of the time intervals I to IV with polarity $+ - - +$ and the pulses from the window 2 with polarity $- + + -$. With this polarity sequence for the recording of the pulse numbers, a pulse number difference $N_{R1}-N_{R2}$ is obtained for each period T, the X source pulses $N_{X1}$ and $N_{X2}$ from the windows 1 and 2, respectively, being compensated exactly over the period T, even when the measuring source intensity and thus the pulse numbers $N_{X1}$ and $N_{X2}$ vary linearly with time. The mean value of the recording is thus exactly the difference $N_{R1}-N_{R2}$, i.e. the number of reference pulses on window 1 minus the number of reference pulses on window 2. This difference can be either positive or negative according to variations in the gain and is an exact measure of the gain variation. If one derives from this difference value a correction feedback signal proportional thereto and this feedback signal is used to compensate any change in gain, then stabilization of the grain is obtained by reestablishing equilibrium until the mean difference of the pulse numbers $N_{R1}$ and $N_{R2}$ is zero again.

The method just described can be effected with the apparatus indicated schematically in FIG. 5.

The usual arrangement of an unstabilized γ-spectrometer for analysing the radiation from the X-source 1 includes a detector comprising a scintillator crystal 2 and a photo-multiplier 3. The signals from the detector are applied to a multi-channel analyser whose components are as follows: an H.T. source 4, a pulse amplifier 5, and an analogue to digital converter (ADC) 6a followed by an address-scaler 6b whose output signals are fed to a memory store 8 via a "NOT" gate 7 necessary for the stabilization procedure.

The mechanical part of the stabilizer, i.e. the chopper, is suitably formed as in the first embodiment, and comprises a rotary shutter 9, a reference source 10 and a motor 19 which drives a rotating optical diaphragm 20 connected rigidly to the rotor shutter 9. The rotating diaphragm 20 together with a light source 21 and a photo-cell 22 provides gate control signals necessary for the functioning of the stabilizer corresponding to the time intervals I to IV, as is indicated in FIG. 4.

The electronic part of the stabilizer comprises the following components: a control unit 23 receives from the photo-cell 22 gate-control signals corresponding to the time intervals I to IV and provided therefrom control signals represented inside the block unit 23 in FIG. 5, which latter signals control the "NOT" gate 7 of the analyser, an "AND" gate 28 as well as a signal inverter 29 of the stabilizer. The pulse trains generated by the analogue-digital converter 6a of the analyser are analysed by an address-scaler 24 and two units 25 and 26 which represent the windows 1 and 2, and are then fed to a scaler 30 via a delay circuit 27, enabling the scaler 30 to switch to positive or negative counting and an "AND" gate 28 which is opened during each interval I to IV. The scaler 30 counts the pulses from the unit 25 (window 1) positively and the pulses from the unit 26 (window 2) negatively during the time intervals I and IV, and on account of the inverter 29 counts the pulses with correspondingly reversed polarity during the intervals II and III. The scaler 30 has its output connected to a digital-analogue converter (DAC) 31 whose output signal is used as feedback signal applied in the present example to the cathode of the photo-multiplier 3, in order to assure the desired stabilization of the gain of the spectrometer.

In normal operation of the apparatus with stable gain, the pulse frequency VR1 is equal to VR2 and the feedback signal is balanced to zero. If the gain is decreasing, the photo-peak is shifted to the left in FIG. 3a and hence the pulse frequency VR1 increases while VR2 decreases, with the result that a positive feedback signal is produced, which automatically acts to compensate the gain drift. If in the contrary the gain tends to increase, the photo-peak is shifted in right hand direction in FIG. 3a and hence the pulse frequency VR1 decreases while VR2 increases. Consequently, a negative feedback signal is produced, which automatically acts to compensate the gain drift again. Thus the spectrometer is stabilized in gain.

What I claim is:

1. The method of stabilizing the gain of a nuclear pulse spectrometer which comprises the steps of periodically chopping and superimposing during a first series of small time intervals a reference source radiation upon the radiation from a source being measured, analysing and recording pulses produced from the superimposed radiations to obtain a first series of gain-dependent pulse numbers, analyzing and recording pulses produced only from said radiation source and with said reference source blocked during a second series of small time intervals having a length substantially equal to those of said first series but shifted with respect to time to obtain a second series of pulse numbers, subtracting said first and second series of pulse numbers to obtain their difference, comparing said pulse number difference with a series of gain-independent standard pulse numbers to obtain a third series of numbers from which a control quantity is derived, and utilizing said control quantity to compensate any drift in gain of the spectrometer, the compensation serving to reduce said third series of numbers and hence said control quantity towards zero.

2. The method as defined in claim 1 wherein said second series of pulse numbers are obtained by superimposing during said second series of small time intervals said gain-independent standard pulse numbers on the pulses produced from the radiation from said source being measured.

3. The method as defined in claim 1 which includes the steps of utilizing the radiation from said reference source during said first series of small time intervals to provide gain-dependent reference source pulses as well as to provide the gain-independent standard pulses by appropriate discrimination of the reference source pulses, and in which the standard pulses, the reference source pulses and the pulses from the source of radiation being measured provide together said first series of pulse numbers.

4. The method as defined in claim 3 wherein said spectrometer includes a radiation detector which reacts to mono-energetic radiation with at least partial uniformity of signal amplitude by producing a peak, and wherein to produce the standard pulses the whole peak is encompassed by discrimination of the radiation from said reference source, and wherein said gain-dependent reference source pulses are obtained by discrimination at the pulse amplitude value of the peak.

5. The method of stabilizing the gain of a nuclear pulse spectrometer which comprises the steps of periodically chopping and superimposing during a first series of small time intervals a reference source radiation upon the radiation from a source being measured, analyzing and recording pulses produced from the superimposed radiations to obtain a first series of gain-dependent pulse numbers, analyzing and recording pulses produced only from said radiation source and with said reference source blocked during a second series of small time intervals having a length substantially equal to those of said first series but shifted with respect to time to obtain a second series of pulse numbers, subtracting said first and second series of pulse numbers to obtain their difference, comparing said pulse number difference with a series of gain-inversely dependent pulse numbers to obtain a third series of numbers from which a control quantity is derived, and utilizing said control quantity to compensate any drift in gain of the spectrometer, the compensation serving to reduce said third series of numbers and hence also said control quantity towards zero.

6. The method of stabilizing the gain of a nuclear pulse spectrometer having a radiation detector which responds to mono-energetic radiation with at least partial uniformity of signal amplitude by producing a peak, which includes the steps of periodically chopping and superimposing during a first series of small time intervals a reference source radiation upon the radiation from a source being measured, producing pulses from said superimposed radiations, analyzing said pulses by discrimination in two windows arranged side-by-side and dividing said peak thereby to obtain a first series of gain-dependent pulse numbers from one window and inversely gain-dependent pulse numbers from the other window, producing pulses from only the radiation from said source being measured and during a second series of small time intervals of substantially the same length as said first series of small time intervals but displaced in time and with said reference radiation source blocked, analyzing the last said pulses by discrimination in said windows to obtain a second series of pulse gain-dependent numbers from one window and inversely gain-dependent pulse numbers from the other window, periodically subtracting the second pulse numbers obtained from one window from the first pulse numbers obtained from the same window in order to produce a first series of pulse number differences, periodically subtracting the second pulse numbers obtained from the other window from the first pulse numbers obtained from the same window in order to produce a second series of pulse number differences, periodically subtracting said first and second pulse number differences from each other to obtain a series of control pulse numbers, deriving a control quantity from last said pulse numbers, and utilizing said control quantity to compensate any drift in gain of the spectrometer, the compensation serving to reduce said series of control pulse numbers and hence also said control quantity towards zero.

7. The method as defined in claim 6 where for a cycle of four successive time intervals the phase displacement is made negative for one pair of time intervals and positive for the other pair of time intervals.

8. The method as defined in claim 7 wherein the negative and positive phase displacements of the time intervals are equal in magnitude.

9. A gain-stabilized pulse spectrometer apparatus comprising means including a chopper device for periodically imposing radiation from a reference source upon an actual source of radiation being measured during a first series of small time intervals, a pulse producing device fed continuously by said actual source of radiation and periodically by said superimposed reference and actual radiation sources, said pulse producing device producing a first series of pulse numbers which are gain-dependent in response to the application thereto of said superimposed reference and actual radiation sources, means producing gain-independent standard pulses during a second series of small time intervals of substantially the same length as the time intervals of said first series but displaced in time, means superimposing said standard pulses on pulses produced by said pulse producing device as a result of the feed thereto of radiation only from said actual source of radiation to produce a second series of pulse numbers which are gain-independent, means for subtracting said first and second pulse number series to produce a pulse difference number series, means producing from said pulse difference number series a control signal proportional thereto, and means applying said control signal as an inverse feedback to said spectrometer to stabilize the gain thereof.

10. Apparatus for stabilizing the gain of a nuclear pulse spectrometer responsive to radiation from a source being measured which comprises a scintillator crystal continuously exposed to radiation from the source being measured, a photo-multiplier connected to said crystal and which produces pulses in response to the radiation falling upon said crystal, a reference source of radiation, chopper means interposed between said reference radiation source and said crystal for periodically interrupting passage of reference source radiation thereto, means synchronized with said chopper means for producing first and second series of small time interval signals substantially equal in length but displaced in time, a pulse amplifier connected to the output of said photo-multiplier, a reference discriminator connected to the output of said pulse amplifier, a first AND gate connected to the output of said reference discriminator, a diode pump connected to the output of said first AND gate, a polarity inverter connected to the output of said diode pump, an integrator connected to the output of said polarity inverter, an oscillator producing standard pulses, a second AND gate connected between the output of said oscillator and said pulse amplifier, means applying said first series of time interval signals to said first AND gate to pass to said integrator the pulses produced respectively by said source of radiation being measured and by said reference source when it is not blocked off from said crystal and which exceed a threshold value defined by said reference discriminator, and to actuate said polarity inverter to effect addition of pulses during the next following time intervals, means applying said second series of time interval signals to said first and second AND gates to pass to said integrator the pulses produced respectively by said oscillator and said source of radiation being measured and which exceed the threshold value defined by said reference discriminator, and to actuate said polarity inverter to effect subtraction of pulses during the next following time intervals, said diode pump serving to deliver either positive or negative charges to said integrator in dependence upon whether said polarity inverter is in its additive or subtractive state, and said integrator serving to produce an analogue signal proportional to the time-wise mean value of the arithmetic sum of the charges applied thereto and which is inversely fed back for gain stabilization.

11. Apparatus as defined in claim 10 which includes a pulse counter connected to the output of said pulse amplifier through a NOT gate controlled by said chopper means for blocking out said standard pulses and the pulses produced by radiation from said reference source.

References Cited

UNITED STATES PATENTS

| | | | |
|---|---|---|---|
| 2,870,343 | 1/1959 | Golay | 88—88.14 X |
| 2,956,165 | 10/1960 | Johnson | 250—83.3 |
| 3,056,885 | 10/1962 | Scherbatskoy | 250—71.5 |
| 3,188,353 | 5/1965 | Baldwin | 250—71.5 |

RALPH G. NILSON, *Primary Examiner.*

SAUL ELBAUM, *Assistant Examiner.*

U.S. Cl. X.R.

88—14

PO-1050
(5/69)

UNITED STATES PATENT OFFICE
CERTIFICATE OF CORRECTION

Patent No. 3,428,804          Dated February 18, 1969

Inventor(s) Angelo Comunnetti

It is certified that error appears in the above-identified patent and that said Letters Patent are hereby corrected as shown below:

Column 1, lines 9 and 10, cancel "application Switzerland, June 4, 1964, 7,402/64" and substitute -- applications in Switzerland, June 4, 1964, 7,402/64 and February 8, 1965 1,800/65. --

SIGNED AND SEALED

MAR 10 1970

(SEAL)
Attest:

Edward M. Fletcher, Jr.
Attesting Officer

WILLIAM E. SCHUYLER, JR.
Commissioner of Patents